US012558280B1

(12) United States Patent
Lyons, Jr.

(10) Patent No.: US 12,558,280 B1
(45) Date of Patent: Feb. 24, 2026

(54) MASSAGE TABLE CRADLE

(71) Applicant: Willie J. Lyons, Jr., Blythewood, SC (US)

(72) Inventor: Willie J. Lyons, Jr., Blythewood, SC (US)

( * ) Notice: Subject to any disclaimer, the term of this patent is extended or adjusted under 35 U.S.C. 154(b) by 0 days.

(21) Appl. No.: 18/914,535

(22) Filed: Oct. 14, 2024

(51) Int. Cl.
*A61G 13/12* (2006.01)
*A61G 13/00* (2006.01)

(52) U.S. Cl.
CPC ......... *A61G 13/121* (2013.01); *A61G 13/009* (2013.01)

(58) Field of Classification Search
CPC .. A61G 13/00; A61G 13/0054; A61G 13/009; A61G 13/10; A61G 13/121; A47G 9/1054
See application file for complete search history.

(56) References Cited

U.S. PATENT DOCUMENTS 2,688,142 A * 9/1954 Jensen ................. A47G 9/1009 5/644
3,315,282 A * 4/1967 Lowery ................ A47G 9/1054 132/212
3,828,377 A * 8/1974 Fary, Sr. .............. A47C 20/026 5/639
4,757,983 A * 7/1988 Ray ........................ A61G 13/12 5/640
5,214,815 A * 6/1993 Agbodoe ............... A61G 13/12 5/622
5,613,501 A * 3/1997 Michelson ......... A61G 13/0054 5/639
5,682,632 A * 11/1997 Cotroneo ........... A61G 13/1215 5/636
5,778,887 A * 7/1998 Curtiss ..................... A61G 7/07 128/845
5,960,494 A * 10/1999 Gilliland ............ A61G 13/0081 5/713
7,543,345 B2 * 6/2009 Wilson ................. A47C 20/026 5/636
7,676,867 B2 * 3/2010 De Laura ........... A61G 13/0054 5/643
9,308,147 B2 * 4/2016 Davis ................... A61G 13/121
9,398,992 B1 * 7/2016 Jansen ................. A47C 20/026
10,201,240 B1 * 2/2019 Arrighi ................ A47G 9/1054
10,517,764 B2 * 12/2019 Arsenault ............... A61F 9/025
11,571,349 B2 * 2/2023 Johnson ............. A61G 13/1235
11,865,050 B1 * 1/2024 Louis ..................... A61H 37/00
2006/0150336 A1 * 7/2006 Jackson, III ......... A47G 9/1054 5/644

(Continued)

FOREIGN PATENT DOCUMENTS

WO 2021099653 A1 5/2021

*Primary Examiner* — George Sun
(74) *Attorney, Agent, or Firm* — Gugliotta & Gugliotta LPA

(57) ABSTRACT

An improved massage table cradle is provided that protects eyelashes, reduces claustrophobia, and improves airflow around the face during face-down positioning on a massage table. The cradle features adjustable forehead and cheek pads with a 2-inch gap for the eyes, a 3-inch high-density foam cushion, flexible side-to-side adjustment, and a face cover made from easily sanitized material. The design ensures that the cradle is soft on the face yet supportive to the head and neck, allowing for an unimpeded massage experience.

20 Claims, 8 Drawing Sheets

(56) References Cited

U.S. PATENT DOCUMENTS

| | | | | |
|---|---|---|---|---|
| 2006/0290194 | A1* | 12/2006 | Roleder | A47C 20/026<br>297/397 |
| 2009/0013471 | A1* | 1/2009 | Yang | A47C 7/383<br>5/636 |
| 2011/0131727 | A1* | 6/2011 | Skripps | A61G 13/101<br>5/622 |
| 2013/0007961 | A1* | 1/2013 | Noh | A47G 9/10<br>5/638 |
| 2014/0076331 | A1* | 3/2014 | Cho | A61G 13/121<br>128/845 |
| 2014/0318571 | A1* | 10/2014 | Rajkovich | A45D 44/12<br>132/319 |
| 2015/0245968 | A1* | 9/2015 | Mitchell | A61H 39/04<br>5/638 |
| 2016/0067098 | A1* | 3/2016 | St. Hilaire | A45D 44/12<br>2/431 |
| 2016/0151221 | A1* | 6/2016 | Mount | A47C 7/38<br>5/636 |
| 2017/0340127 | A1* | 11/2017 | Bennetts | A61G 13/12 |
| 2018/0317663 | A1* | 11/2018 | Nam | A61G 13/122 |
| 2018/0317678 | A1* | 11/2018 | Peric | A61G 13/1215 |
| 2019/0313817 | A1* | 10/2019 | Morden | A47G 9/1054 |
| 2020/0205504 | A1* | 7/2020 | LaHera | A61G 13/121 |
| 2021/0212876 | A1* | 7/2021 | Johnson | A61G 15/12 |
| 2021/0267802 | A1* | 9/2021 | Ball | A61F 9/027 |
| 2022/0408947 | A1* | 12/2022 | Du | A47G 9/1054 |
| 2023/0000713 | A1* | 1/2023 | Jones | A61H 7/001 |
| 2023/0060214 | A1* | 3/2023 | Brown | A45D 44/12 |

* cited by examiner

MASSAGE TABLE CRADLE

RELATED APPLICATIONS

There are no previously filed, nor currently any co-pending applications, anywhere in the world.

BACKGROUND OF THE INVENTION

1. Field of the Invention

The present invention relates to a massage table improvements and, more particularly, to a massage table cradle is the discomfort and potential harm experienced by individuals lying face down on a massage table, particularly concerning eyelash damage, claustrophobia, and restricted airflow around the face.

2. Description of the Related Art

In the realm of massage therapy and related fields, the use of massage tables with face cradles is a common practice to support and position individuals comfortably during face-down procedures. However, conventional massage table cradles often fall short in addressing specific concerns that can significantly impact the overall experience of the user. These issues include:

Eyelash Damage: Many standard cradles do not provide adequate space or protection for the eyes, leading to potential friction and pressure on the eyelashes. This can result in bending, breaking, or loss of eyelashes, which is particularly problematic for individuals with longer or more delicate lashes.

Claustrophobia: The enclosed and confined space created by traditional face cradles can induce feelings of claustrophobia in some individuals, leading to discomfort and anxiety during the procedure.

Restricted Airflow: The design of typical cradles often does not allow for sufficient airflow around the face, which can result in breathing difficulties and increased discomfort for the user.

Lack of Customization: Many cradles offer limited adjustability, making it challenging to accommodate different face shapes and sizes, thereby compromising comfort and support.

These shortcomings in the prior art highlight the need for an innovative solution that addresses these specific concerns while maintaining the functionality and comfort required for effective massage and bodywork sessions.

SUMMARY OF THE INVENTION

It is thus an object of the present invention to provide an improved massage table head cradle that addresses long felt needs resulting from shortcomings of existing cradle designs.

It is a feature of the present invention to provide eyelash protection. The inclusion of adjustable forehead and cheek pads with a 2-inch gap for the eyes specifically protect eyelashes from bending or being touched, which is a concern that has not been directly addressed by traditional massage table cradles.

It is another feature of the present invention to alleviate claustrophobia and improve breathing airflow. The improved massage table cradle incorporates a design that considers the comfort of individuals who may experience claustrophobia or discomfort due to restricted airflow around the face when lying face down. This is an aspect that is often overlooked in conventional cradle designs.

It is yet another feature of the present invention to provide a customizable fit. By using flexible side-to-side adjustment of the cradle, a customizable fit accommodates different face shapes and sizes, ensuring comfort and support for a wider range of users.

It is still another feature of the present invention to utilized easily sanitized vinyl or leather material for the face cover promotes hygiene and easy cleaning after each use, which is essential for maintaining a sanitary environment in massage or medical settings.

It is still another feature of the present invention to provide for improved stability and support, wherein cheek pads are reinforced with ¼-inch-thick plastic back support, providing flexibility while maintaining stability, which is crucial for ensuring that the head and neck are supported without compromising the massage experience.

Briefly described according to a preferred embodiment of the present invention, an innovative massage table cradle is provided to enhance the comfort and safety of individuals lying face down during massages or other procedures. Its key features include adjustable forehead and cheek pads with a generous 2-inch gap for the eyes, ensuring that eyelashes remain untouched and protected. The cradle is equipped with a 3-inch high-density foam cushion for optimal comfort and support, and its flexible side-to-side adjustment allows for a customizable fit to accommodate different face shapes and sizes. The cheek pads are reinforced with ¼-inch-thick plastic back support for stability, and the face cover is made from easily sanitized vinyl or leather material for hygiene. Additionally, the issues of claustrophobia and airflow around the face are addressed and resolved, making it a comprehensive solution for a comfortable and stress-free experience. The back support features a thick hook and loop fastener for compatibility with various face cradle supports, and a 24-inch strap with a hook and loop fastener is included for securing a cloth face cover and tightening the eye gap.

It is an advantage of the present invention that it provides adjustable forehead and cheek pads with a 2-inch gap for the eyes, ensuring that eyelashes remain untouched and protected during face-down procedures.

It is another advantage of the present invention that it addresses claustrophobia by offering a more open and breathable space around the face, thereby improving airflow and reducing anxiety for the user.

It is an advantage of the present invention that it features a customizable fit with flexible side-to-side adjustment, accommodating different face shapes and sizes for enhanced comfort and support.

It is another advantage of the present invention that it utilizes easily sanitized vinyl or leather material for the face cover, promoting hygiene and easy cleaning after each use.

It is an advantage of the present invention that it includes a thick hook and loop fastener for compatibility with various face cradle supports, allowing for easy attachment and adjustment.

It is another advantage of the present invention that it is equipped with a 24-inch strap with a hook and loop fastener for securing a cloth face cover and tightening the eye gap, further enhancing user comfort and protection.

It is an advantage of the present invention that it features a 3-inch high-density foam cushion, providing optimal comfort and support for the head and neck during face-down positioning.

It is another advantage of the present invention that it has cheek pads reinforced with ¼-inch-thick plastic back support, offering flexibility while maintaining stability for the user's face.

It is an advantage of the present invention that its design is soft on the face yet supportive to the head and neck, allowing for an unimpeded massage experience.

It is another advantage of the present invention that it is suitable for multiple applications, including body massages, tanning, medical procedures, and use in resorts, hotels, and cruise ships, making it a versatile accessory for various settings.

Further features of the invention will become apparent in the course of the following description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

Figure 1:
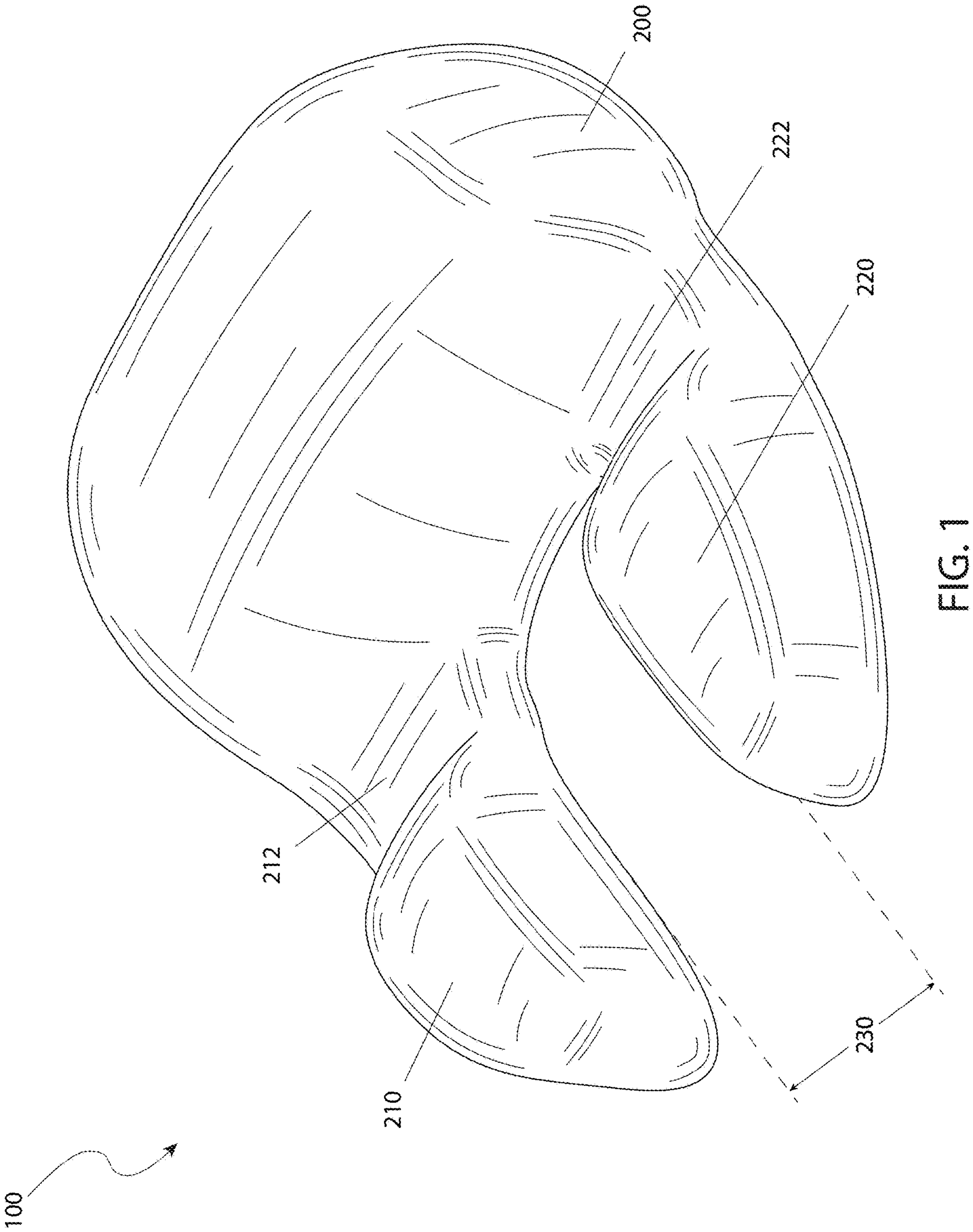
FIG. 1 is a front isometric view of a face cradle cushion 100, according to an embodiment of the present invention.
Figure 2:
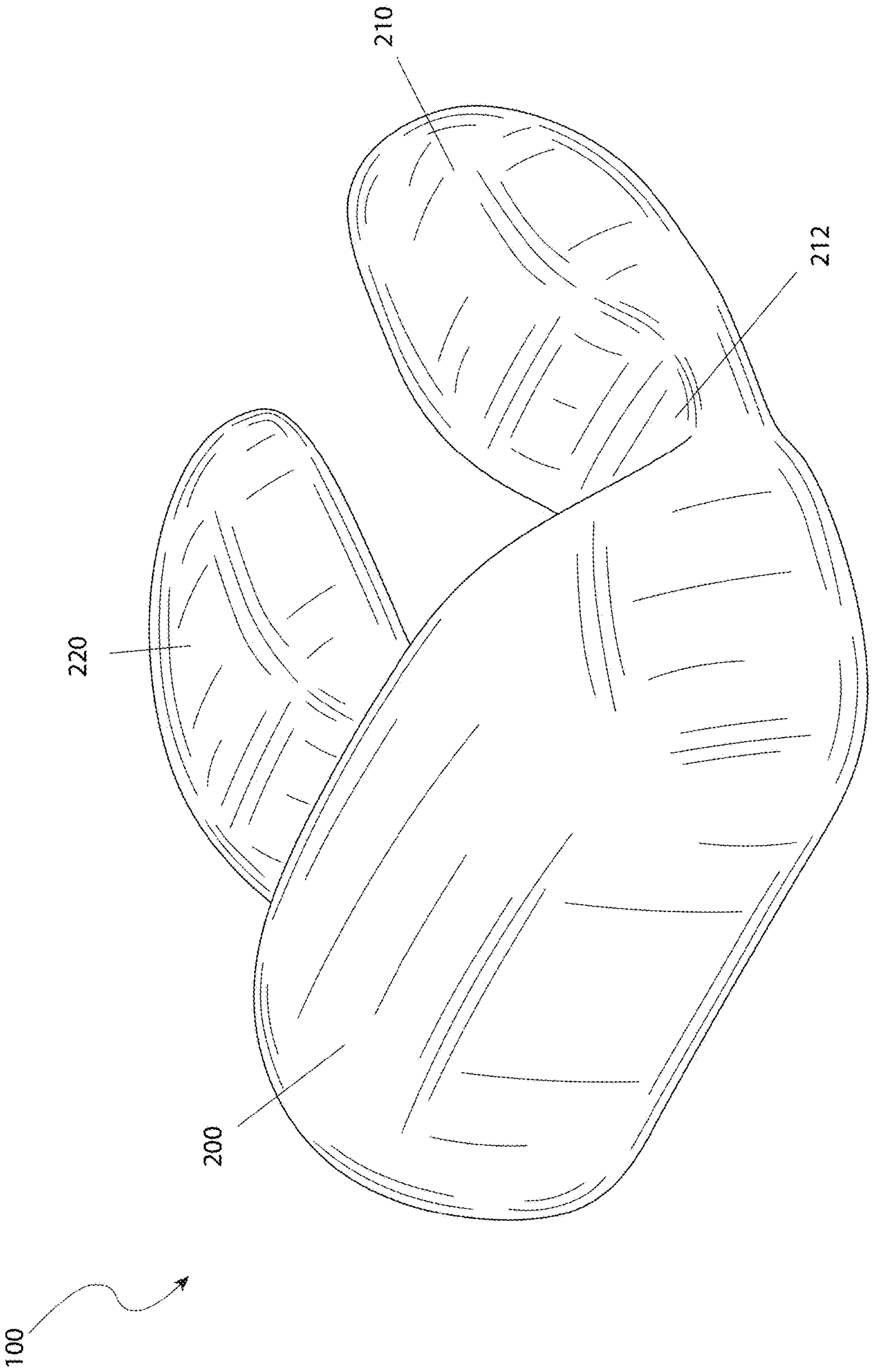
FIG. 2 is a rear isometric view of a face cradle cushion 100, according to an embodiment of the present invention.
Figure 3:
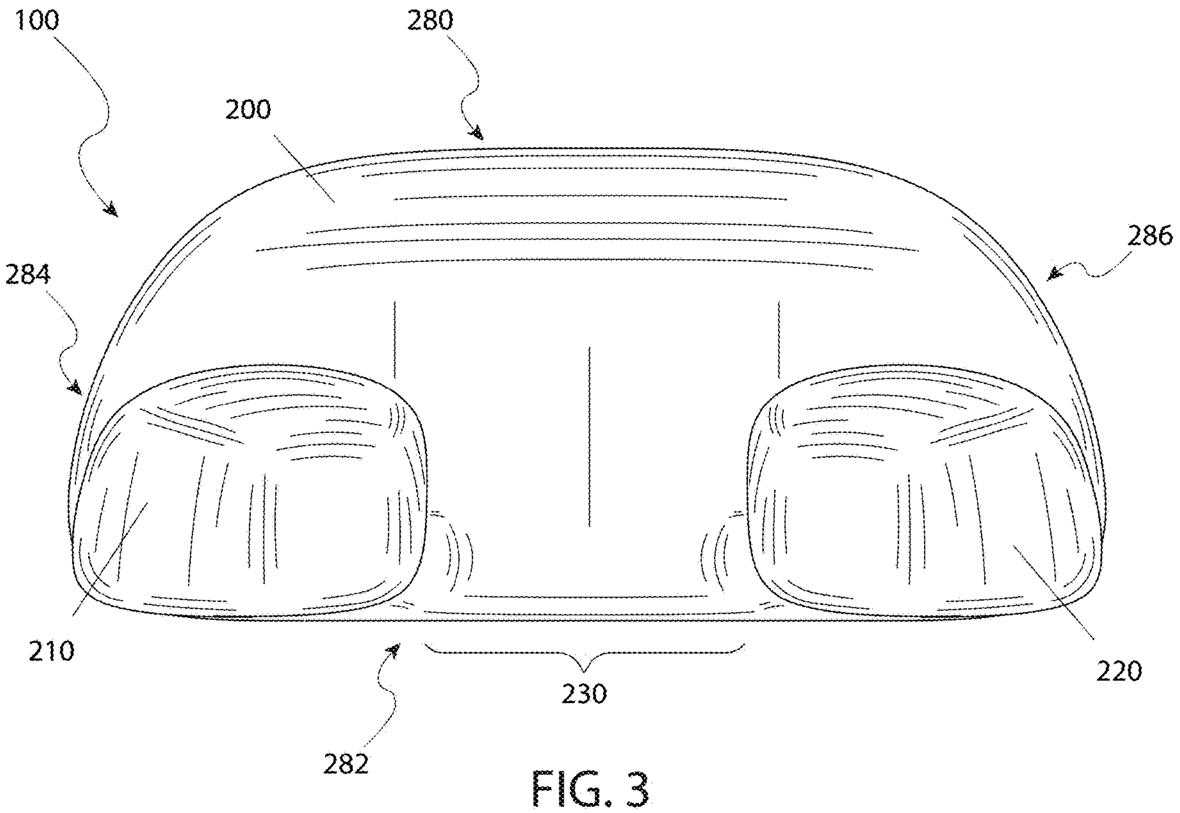
FIG. 3 is a front view of a face cradle cushion 100, according to an embodiment of the present invention.
Figure 4:
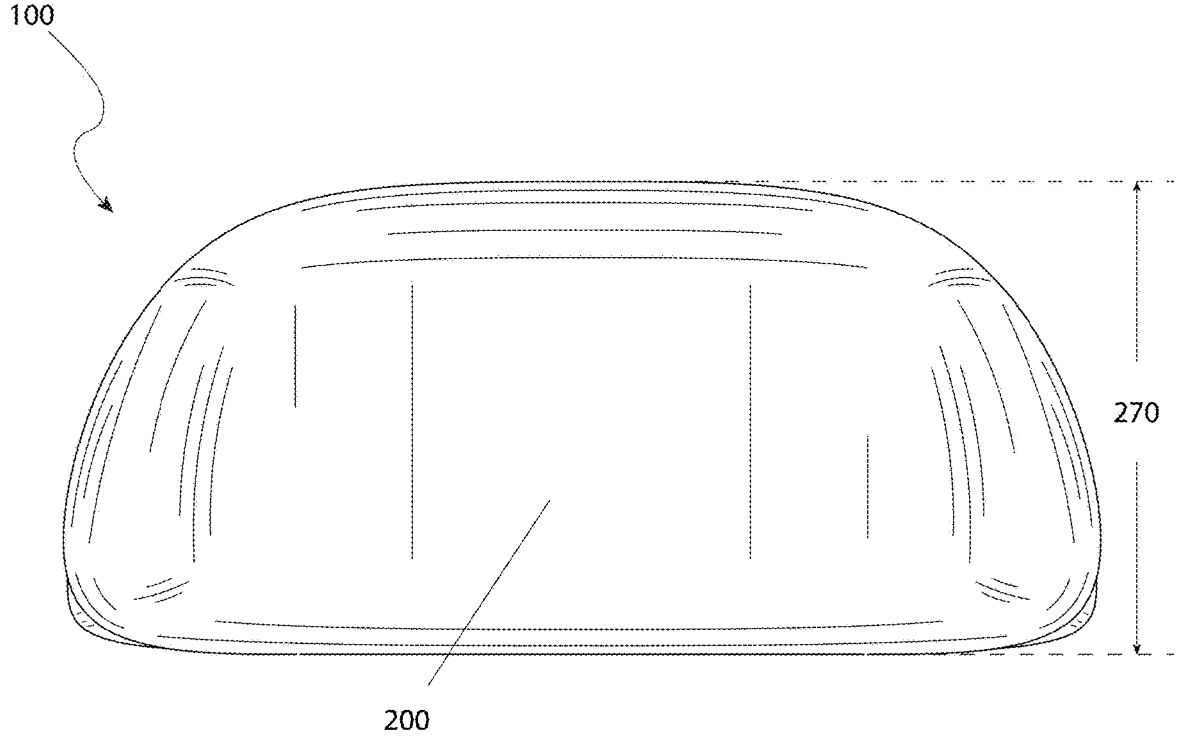
FIG. 4 is a rear view of a face cradle cushion 100, according to an embodiment of the present invention.
Figure 5:
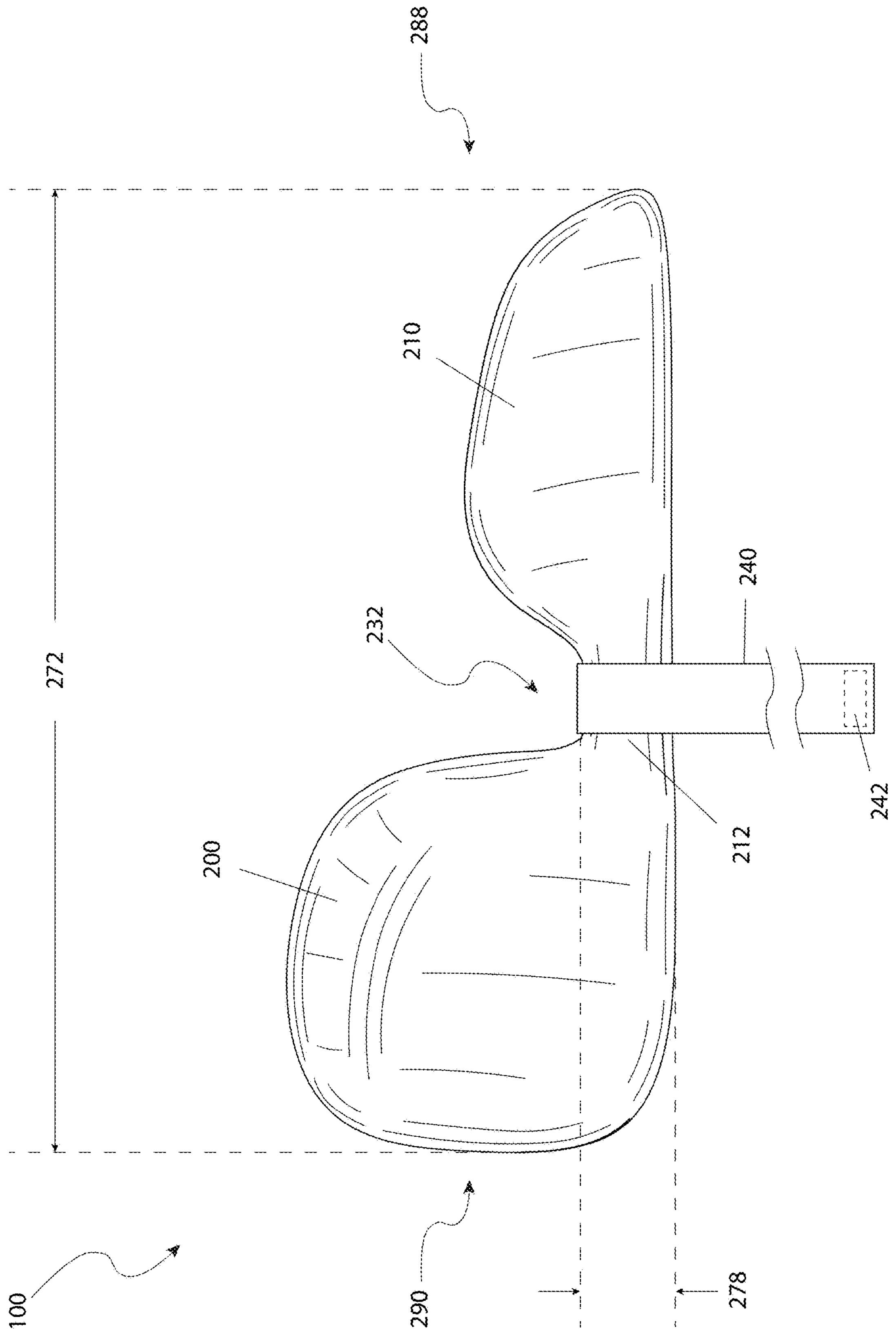
FIG. 5 is a left side view of a face cradle cushion 100, according to an embodiment of the present invention.
Figure 6:
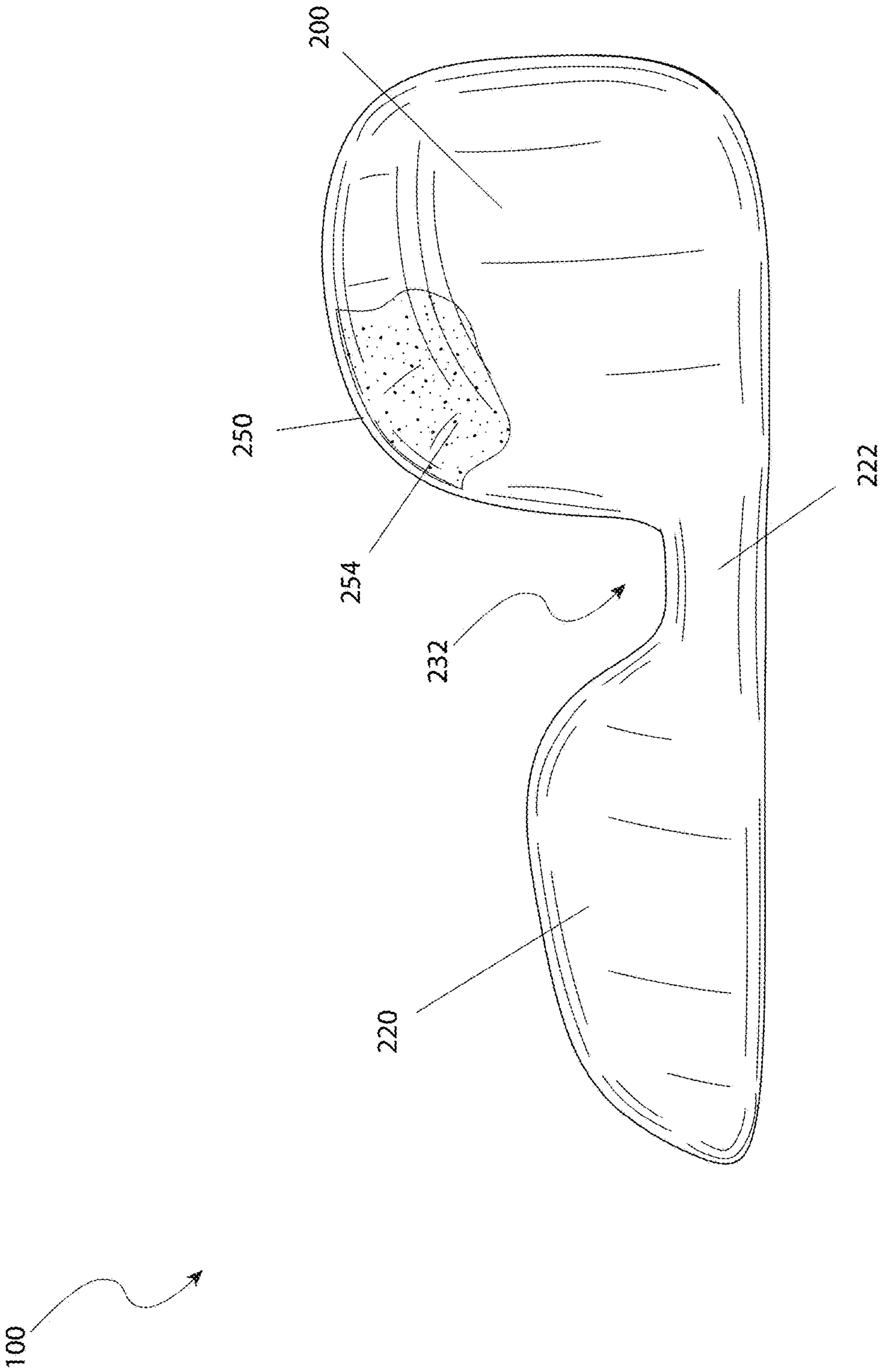
FIG. 6 is a right side view of a face cradle cushion 100, according to an embodiment of the present invention.
Figure 7:
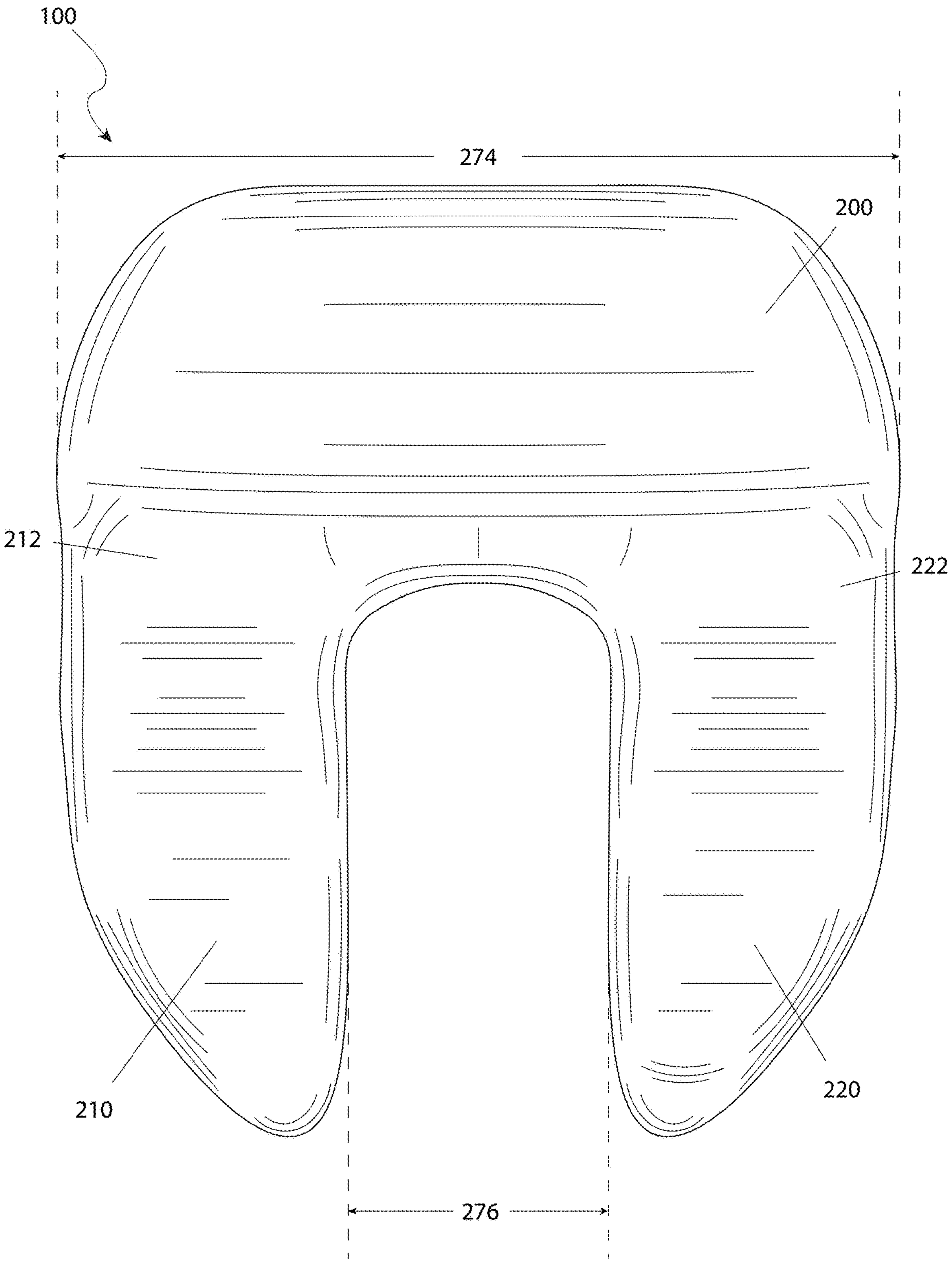
FIG. 7 is a top view of a face cradle cushion 100, according to an embodiment of the present invention.
Figure 8:
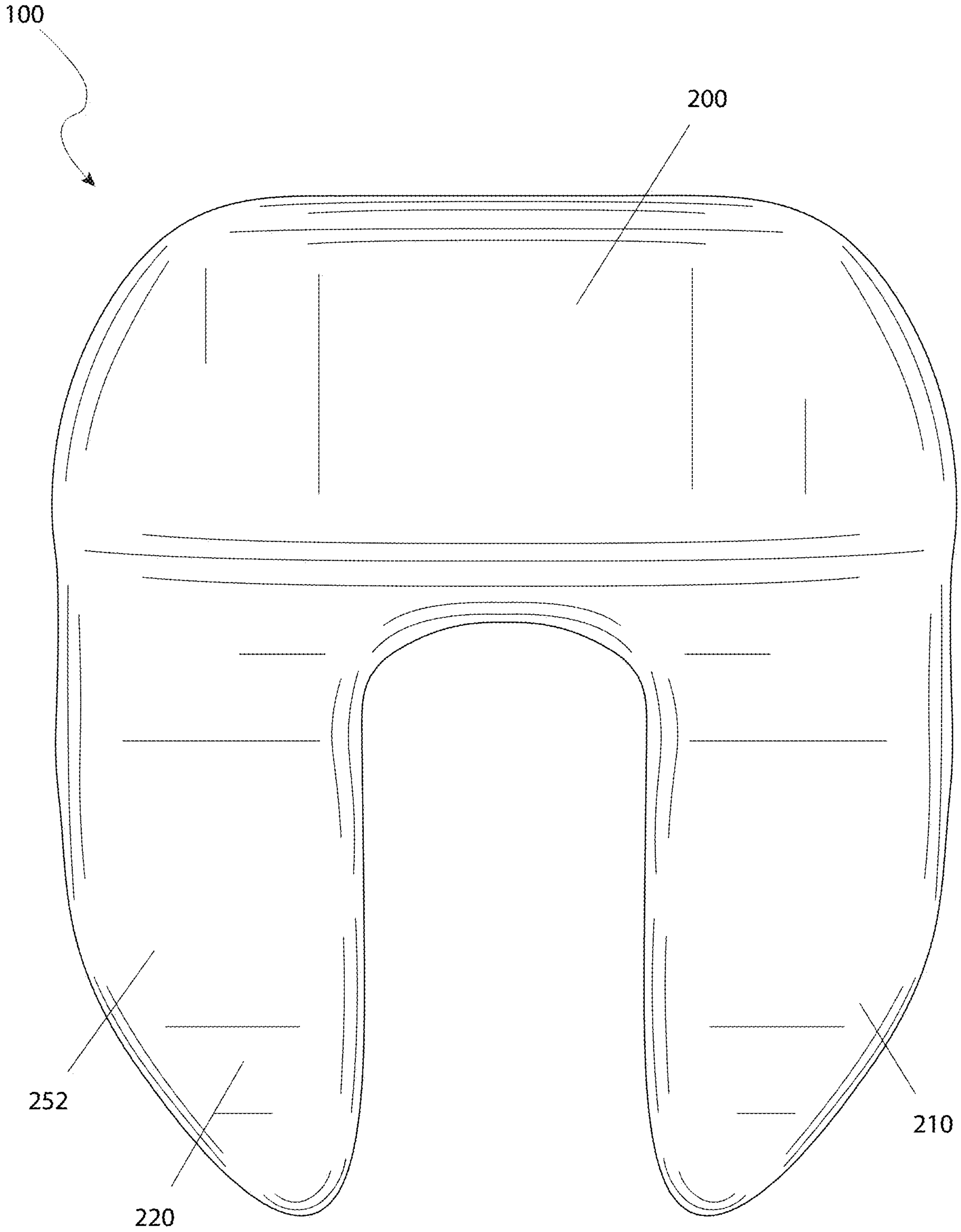
FIG. 8 is a bottom view of a safe lash face cradle cushion 100, according to an embodiment of the present invention; and, FIG. 9 is an in-use view of a face cradle cushion 100, according to an embodiment of the present invention.
Figure 9:
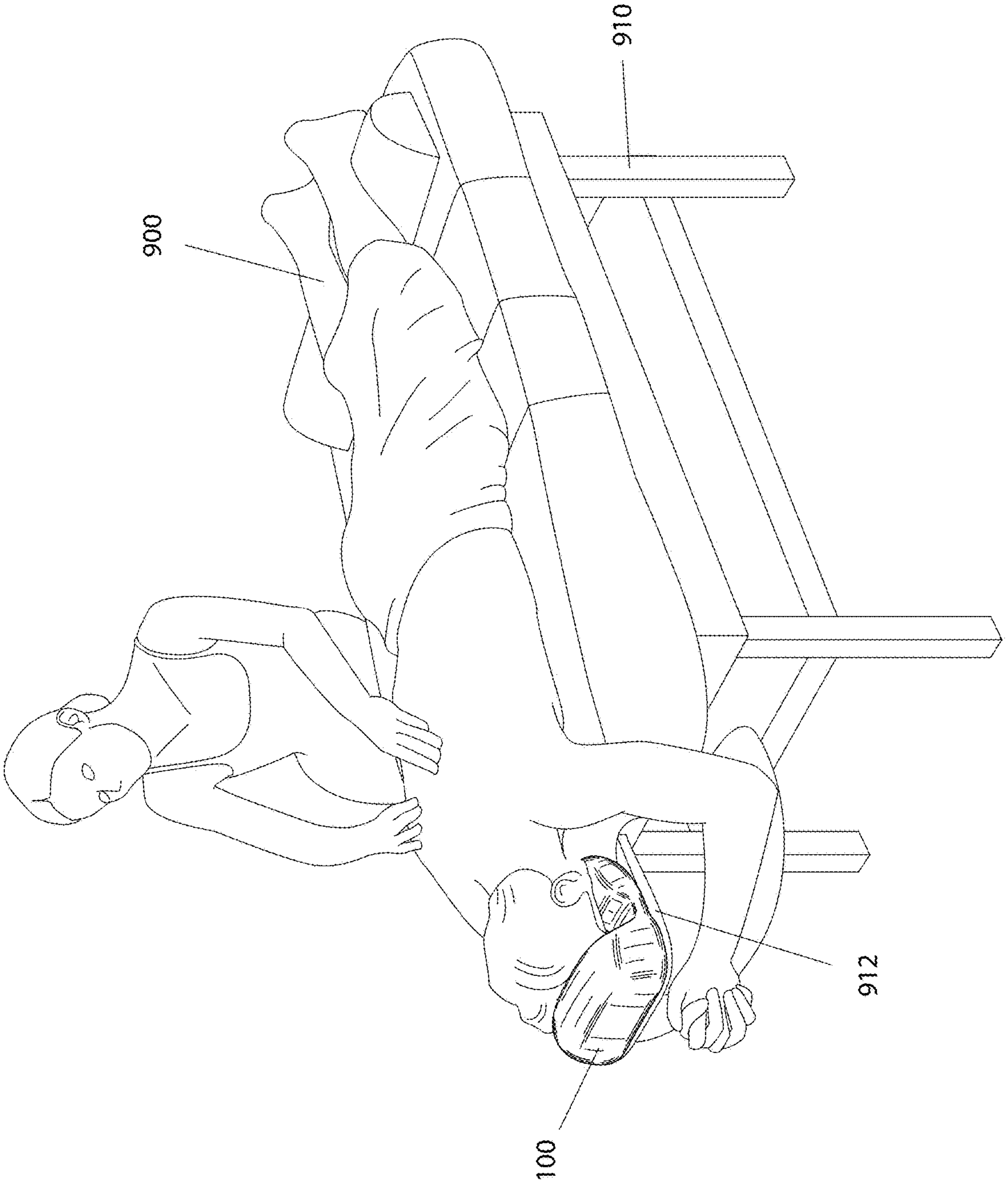

The best mode for carrying out the invention is presented in terms of its preferred embodiment, herein depicted within the Figures. It should be understood that the legal scope of the description is defined by the words of the claims set forth at the end of this patent and that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims. Finally, unless a claim element is defined by reciting the word "means" and a function without the recital of any structure, it is not intended that the scope of any claim element be interpreted based on the application of 35 U.S.C. § 112, sixth paragraph.

The best mode for carrying out the invention is presented in terms of its preferred embodiment, herein depicted within the Figures.

1. Detailed Description of the Figures

The present invention is directed to a face cradle cushion (herein described as the "invention") 100. The invention 100 may comprise a forehead pad 200, a left cheek pad 210, a right cheek pad 220, and a strap 240. The invention 100 may be a one-piece face cradle cushion comprising three (3) connected pads. The invention 100 may be adapted to accept the face of a client 900 lying in a prone position on a massage table 910 without damaging eyelashes of the client 900. The invention 100 may be adapted to support the forehead on the forehead pad 200 and the client's cheeks on the left cheek pad 210 and the right cheek pad 220 with the eyelashes in a gap 230 between the left cheek pad 210 and the right cheek pad 220. The left cheek pad 210 and the right cheek pad 220 may be adapted to flex laterally in order to adjust for the size of the face.

The invention 100 may define a top side 280 which may be adapted to accept the face, a bottom side 282 which may be opposite the top side 280 and may contact a face cradle support 912 of the massage table 910, a left side 284, a right side 286, a front side 288 which may be closest to the body of the client 900, and a rear side 290 opposite the front side 288.

The forehead pad 200 may comprise approximately the rear half of the one-piece face cradle cushion as seen from above. The forehead pad 200 may be flat on the bottom side 282 and rounded on the top side 280. The forehead pad 200 may be padded to comfort the client 900.

The left cheek pad 210, the right cheek pad 220, and the gap 230 may comprise the front half of the one-piece face cradle cushion as seen from above. The left cheek pad 210 and the right cheek pad 220 may be mirror images of each other and may be separated by the gap 230. The left cheek pad 210 and the right cheek pad 220 may be flat on the bottom side 282 and rounded on the top side 280. The height of the left cheek pad 210 and the right cheek pad 220 may be lower than the height of the forehead pad 200.

The left cheek pad 210 may be coupled to the forehead pad 200 by a left cheek coupler 212 such that the left cheek pad 210, the left cheek coupler 212, and the forehead pad 200 are inseparable. The left cheek coupler 212 may be an extension of the left cheek pad 210 that is thinner than the left cheek pad 210. The right cheek pad 220 may be coupled to the forehead pad 200 by a right cheek coupler 222 such that the right cheek pad 220, the right cheek coupler 222, and the forehead pad 200 are inseparable. The right cheek coupler 222 may be an extension of the right cheek pad 220 that is thinner than the left cheek pad 210. The bottom side 282 of the forehead pad 200, the left cheek pad 210 the left cheek coupler 212, the right cheek pad 220, and the right cheek coupler 222 may lie in the same horizonal plane.

A void between the left cheek pad 210 and the right cheek pad 220 may define the gap 230. The gap 230 may be adapted to accept the nose, the eyes, and the eyelashes of the client 900 such that the nose, the eyes, and the eyelashes are suspended without touching the one-piece face cradle cushion, the face cradle support 912, and the massage table 910.

The left cheek coupler 212 and the right cheek coupler 222 may be configured to permit lateral flexing of the left cheek pad 210 and the right cheek pad 220. The left cheek pad 210 and the right cheek pad 220 may be adapted to flex laterally in order to adjust the fit of the one-piece face cradle cushion to the client 900.

Vertical narrowing of the one-piece face cradle cushion at the left cheek coupler 212 and the right cheek coupler 222 may define a strap furrow 232. The strap furrow 232 may be configured to accept the strap 240 that may secure the one-piece face cradle cushion to the face cradle support 912. The strap 240 may be tightened to retain the lateral separation of the left cheek pad 210 and the right cheek pad 220 in order to maintain the width of the gap 230. The strap 240 may be a flexible belt-like strip comprising one (1) or more hook-and-loop fasteners 242. The strap 240 may be wrapped around the one-piece face cradle cushion and around the face cradle support 912 and may be secured by coupling the hook-and-loop fasteners 242 on the underside of the face cradle support 912.

The one-piece face cradle cushion may comprise a polymer foam 254 interior with an outer covering 250. As non-limiting examples, the polymer foam 254 may be polyurethane or viscoelastic polyurethane foam (also known as memory foam). In some embodiments, the polymer foam 254 may be molded to shape the one-piece face cradle cushion.

The outer covering 250 may cover the polymer foam 254 using a material that may be cleaned. As non-limiting examples, the outer covering 250 may be vinyl or leather. In some embodiments, the outer covering 250 may comprise a backing 252 on the bottom side 282 in order to prevent the one-piece face cradle cushion from sliding. As a non-limiting example, the backing 252 may be made of nylon in the configuration of the loop side of one (1) or more hook-and-loop fasteners 242.

In some embodiments, the outer covering 250 may be removable for cleaning. As a non-limiting example, the outer covering 250 may separate at a zipper or hook-and-loop fastener that encircles the bottom side 282 of the one-piece face cradle cushion such that the polymer foam 254 may be removed from the outer covering 250.

In a preferred embodiment, the forehead pad 200 may have a top-to-bottom thickness 270 of at least three inches (3 in.), a front-to-rear length 272 of twelve inches with an error of three inches (12+/−3 ins.), and a side-to-side width 274 of twelve inches with an error of two inches (12+/−2 ins.). A gap width 276 may nominally be five inches (5 in.) and the left cheek pad 210 and the right cheek pad 220 may flex to change the gap width 276 between widths of three to seven inches (3-7 in.). A furrow top-to-bottom thickness 278 may be at least one-half inch (½ in.).

2. Operation of the Preferred Embodiment

In use, the invention 100 may be placed onto the face cradle support 912 of a massage table 910. The strap 240 may be placed in the strap furrow 232 and the ends of the strap 240 coupled underneath the face cradle support 912 to retain the one-piece face cradle cushion to the face cradle support 912. The left cheek pad 210 and the right cheek pad 220 may be laterally flexed towards each other or away from each other prior to strapping in order to adjust the one-piece face cradle cushion to match the size of the client 900. The client 900 may lie upon the massage table 910 in a prone position with the face supported by the forehead pad 200, the left cheek pad 210, and the right cheek pad 220. The eyelashes may be positioned within the gap 230 between the left cheek pad 210 and the right cheek pad 220 such that the eyelashes are not damaged by the one-piece face cradle cushion, the face cradle support 912, or the massage table 910.

The exact specifications, materials used, and method of use of the invention 100 may vary upon manufacturing. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The foregoing descriptions of specific embodiments of the present invention are presented for purposes of illustration and description. The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples, and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein but is to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed. They are not intended to be exhaustive nor to limit the invention to precise forms disclosed and, obviously, many modifications and variations are possible in light of the above teaching. The embodiments are chosen and described in order to best explain principles of the invention and its practical application, to thereby enable others skilled in the art to best utilize the invention and its various embodiments with various modifications as are suited to the particular use contemplated. It is intended that a scope of the invention be defined broadly by the Drawings and Specification appended hereto and to their equivalents. Therefore, the scope of the invention is in no way to be limited only by any adverse inference under the rulings of *Warner-Jenkinson Company*, v. *Hilton Davis Chemical,* 520 US 17 (1997) or *Festo Corp*. v. *Shoketsu Kinzoku Kogyo Kabushiki Co.,* 535 U.S. 722 (2002), or other similar caselaw or subsequent precedent should not be made if any future claims are added or amended subsequent to this Patent Application.

What is claimed is:

1. A head receiving cradle having adjustable forehead and cheek pads specifically adapted in size and shape to ensure that eyelashes remain untouched and protected, wherein the forehead and cheek pads comprise a high-density foam core of at least 3 inches in thickness and an outer sanitizable covering, and wherein the cheek pads are reinforced with ¼-inch-thick plastic back support for maintaining stability while allowing lateral flexibility.

2. The head receiving cradle of claim 1, further comprising:

adjustable memory foam forehead and cheek pads specifically contoured for therapeutic comfort;

a therapeutic spacing gap of 2-3 inches between the pads configured to prevent contact with eyelashes while allowing natural breathing;

a gradual-response cushioning system of 3-4 inches in thickness incorporating multiple foam densities for optimal therapeutic support;
a pressure-distribution mechanism enabling natural side-to-side adjustment movement to accommodate different facial structures during therapy;
a hypoallergenic, antimicrobial cover made from medical-grade vinyl or therapeutic-grade leather;
a therapeutic mounting system with vibration-dampening elements for attaching to massage tables; and
an adjustable therapeutic stabilizing system incorporating elastic elements for maintaining optimal pad positioning during therapy.

3. The massage table cradle of claim 2, wherein the adjustable-therapeutic pads.

4. The massage table cradle of claim 2, wherein the cushioning system comprises therapeutic-grade viscoelastic foam specifically engineered to conform to facial contours while maintaining structural support during massage therapy.

5. The massage table cradle of claim 2, wherein the pressure-distribution mechanism.

6. The massage table cradle of claim 2, wherein the face hypoallergenic cover is further features reinforced seams and therapeutic-grade materials certified for extended skin contact during massage sessions.

7. The massage table cradle of claim 2, wherein the hypoallergenic mounting system is includes vibration-isolating elements specifically designed to enhance relaxation during massage therapy.

8. The massage table cradle of claim 2, wherein therapeutic stabilizing system incorporates graduated resistance elements that respond naturally to client movement during therapy.

9. A therapeutic support system for massage tables comprising:
therapy-optimized forehead and cheek pads with a 2-inch therapeutic breathing gap;
a therapeutic-grade viscoelastic foam cushion of 3 inches providing progressive support;
pressure-mapping comfort zones responding to natural facial movements during therapy;
antimicrobial therapeutic covering ensuring hygiene during extended massage sessions;
therapeutic stabilization incorporating natural movement patterns.

10. The system for improved head support in conjunction with a support table of claim 9, wherein the support table is further adapted for a use selected from a group consisting of: a massage table; a tanning bed; a chiropractic table; a medical procedure table.

11. A massage table cradle comprising:
a forehead pad comprising a high-density foam core;
a left cheek pad comprising a reinforced plastic back support;
a right cheek pad comprising a reinforced plastic back support;
wherein the forehead pad, left cheek pad, and right cheek pad are connected to form a one-piece face cradle cushion;
a gap of at least 2 inches between the left cheek pad and the right cheek pad, the gap configured to accommodate a user's nose and eyes while preventing contact with eyelashes; and
wherein the left cheek pad and the right cheek pad are configured to flex laterally to adjust to different face sizes while maintaining structural stability through the reinforced plastic back support.

12. The massage table cradle of claim 11, further comprising:
a left cheek coupler connecting the left cheek pad to the forehead pad; and
a right cheek coupler connecting the right cheek pad to the forehead pad;
wherein the left cheek coupler and right cheek coupler are configured to permit lateral flexing of the left cheek pad and right cheek pad.

13. The massage table cradle of claim 12, wherein the left cheek coupler and right cheek coupler are thinner than the left cheek pad and right cheek pad, respectively.

14. The massage table cradle of claim 11, further comprising a therapeutic comfort channel defined by ergonomic contouring of the one-piece face cradle cushion, the therapeutic comfort channel incorporating: graduated depth transitions specifically engineered to prevent pressure points; integrated airflow pathways that maintain ventilation during extended therapy sessions; and anatomically-optimized dimensions that accommodate natural breathing patterns while supporting proper cervical alignment.

15. The massage table cradle of claim 14, further comprising a therapeutic stabilization system including: multi-zone comfort straps featuring variable elasticity regions; pressure-distributing anchor points integrated into the cradle structure; and quick-release therapeutic adjustment mechanisms allowing natural micro-movements while maintaining overall stability.

16. The massage table cradle of claim 11, wherein the one-piece face cradle cushion comprises:
a viscoelastic polyurethane foam interior specifically engineered for pressure distribution and patient comfort,
a removable outer covering made from medical-grade vinyl or antimicrobial leather that fully encases the foam interior; and
integral ventilation channels molded within the foam interior to facilitate airflow around the patient's face while maintaining structural integrity.

17. The massage table cradle of claim 16, further comprising a multi-zone backing system on the bottom side of the one-piece face cradle cushion, wherein the backing system includes: co
a central high-friction zone comprising silicone-enhanced hook-and-loop material for secure mounting;
peripheral stabilizing zones with reinforced attachment points; and
integrated alignment markers for consistent positioning.

18. The massage table cradle of claim 11, wherein:
the forehead pad incorporates progressively firmer foam densities from top to bottom to provide enhanced support;
the pad structure includes specifically engineered transition zones between different density regions to prevent pressure points; and
the overall design maintains therapeutic alignment of the patient's cervical spine.

19. The massage table cradle of claim 11, wherein:
the gap between the left cheek pad and the right cheek pad features variable width adjustment from 2-7 inches controlled by an indexed positioning mechanism;
the gap includes radiused edges specifically designed to prevent pressure points; and
the gap incorporates ventilation channels to enhance patient comfort.

20. The massage table cradle of claim 11, wherein the height differential between the forehead pad and the cheek pads creates an anatomically-optimized support angle that: promotes natural cervical curvature during therapeutic procedures; redistributes pressure dynamically across contact surfaces; and accommodates different facial structures through progressive resistance zones.

* * * * *